(12) United States Patent
Lu et al.

(10) Patent No.: US 11,503,691 B1
(45) Date of Patent: Nov. 15, 2022

(54) ALWAYS-ON LIGHTING DEVICE HAVING MULTIPLE POWER CONTROLLERS AND CONTROL METHOD THEREOF

(71) Applicant: Xiamen PVTECH Co., Ltd., Fujian (CN)

(72) Inventors: Fuxing Lu, Fujian (CN); Rongtu Liu, Fujian (CN); Hao Ye, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 17/542,477

(22) Filed: Dec. 5, 2021

(30) Foreign Application Priority Data

Oct. 19, 2021 (CN) .......................... 202111224153.0

(51) Int. Cl.
   *H05B 47/11* (2020.01)
(52) U.S. Cl.
   CPC .................................... *H05B 47/11* (2020.01)

(58) Field of Classification Search
   CPC ........ H05B 47/00; H05B 47/10; H05B 47/11; H05B 45/00
   See application file for complete search history.

(56) References Cited

U.S. PATENT DOCUMENTS

2004/0012487 A1* 1/2004 Burns .................... H05B 47/16
                                                               340/332

* cited by examiner

*Primary Examiner* — Jimmy T Vu
(74) *Attorney, Agent, or Firm* — Winston Hsu

(57) ABSTRACT

An always-on lighting device having multiple power controllers is provided, which includes a first power controller, a first light source, a second power controller and a second light source. The first power controller and the second power controller execute an alternate mode. In the alternate mode, the first power controller keeps the first light source in on state within a predetermined time period. Then, the first power controller turns off the first light source after the predetermine time period passes and transmits a control signal to the second power controller, such that the second power controller keeps the second light source in on state within the predetermined time period.

10 Claims, 3 Drawing Sheets

ALWAYS-ON LIGHTING DEVICE HAVING MULTIPLE POWER CONTROLLERS AND CONTROL METHOD THEREOF

BACKGROUND OF THE INVENTION

1. Field of the Invention

The present invention relates to a lighting device, in particular to an always-on lighting device having multiple power controllers. The present invention further relates to the control method of the lighting device.

2. Description of the Prior Art

Some buildings (e.g., train stations, high speed rail stations, airports, etc.) should be operating 24 hours a day, so the lighting devices thereof need to always be turned on. However, the lighting devices tend to be damaged if the lighting devices have been in on state for a long period of time, which will reduce the service lives thereof. Accordingly, the lighting systems of these buildings may turn on these lighting devices by turns. However, these lighting devices may still be damaged due to various environmental factors (high outdoor temperature, weather, direction of sunlight, etc.) even if the lighting systems turn on these lighting devices by turns, which cannot satisfy the actual requirements of these buildings.

SUMMARY OF THE INVENTION

The present invention is related to an always-on lighting device having multiple power controllers. In one embodiment of the present invention, the always-on lighting device includes a first power controller, a first light source, a second power controller and a second light source. The first power controller and the second power controller execute an alternate mode. In the alternate mode, the first power controller keeps the first light source in on state within a predetermined time period. Then, the first power controller turns off the first light source after the predetermine time period passes and transmits a control signal to the second power controller, such that the second power controller keeps the second light source in on state within the predetermined time period.

In one embodiment, the first power controller further includes a first temperature detection module. When the first temperature detection module detects that the environmental temperature exceeds a temperature threshold within the predetermined time period, the first power controller adjusts the alternate mode so as to turn off the first light source and transmit the control signal to the second power controller, such that the second power controller keeps the second light source in the on state within the predetermined time period.

In one embodiment, the first power controller further includes a first temperature detection module. When the first temperature detection module detects that the change rate of the operating temperature of the first light source or the first power controller exceeds a change rate threshold within the predetermined time period, the first power controller adjusts the alternate mode so as to turn off the first light source and transmit the control signal to the second power controller, such that the second power controller keeps the second light source in the on state within the predetermined time period.

In one embodiment, the first power controller further includes a first light intensity detection module. When the first light intensity detection module detects that the ambient light intensity is within a first light intensity range, the first power controller reduces a brightness of the first light source. When the first light intensity detection module detects that the ambient light intensity is within a second light intensity range, the first power controller increases the brightness of the first light source.

In one embodiment, when the first light intensity detection module detects that the ambient light intensity is within the first light intensity range, the first power controller executes the alternate mode. When the first light intensity detection module detects that the ambient light intensity is within the second light intensity range, the first power controller performs a master control mode in order to keeps the first light source in the on state within the predetermined time period and simultaneously transmits the control signal to the second power controller for the second power controller to keep the second light source in the on state within the predetermined time period.

The present invention is further related to a control method for an always-on lighting device having multiple power controllers. In one embodiment of the present invention, the control method includes the follow steps: performing an alternate mode by a first power controller and a second power controller; keeping a first light source in an on state within a predetermined time period by the first power controller; turning off the first light source and transmitting a control signal to the second power controller by the first power controller after the predetermined time period passes; and keeping a second light source in the on state within the predetermined time period by the second power controller.

In one embodiment, the control method further includes the following steps: adjusting the alternate mode to turn off the first light source by the first power controller when a first temperature detection module detects that the environmental temperature exceeds a temperature threshold within the predetermined time period; and transmitting the control signal to the second power controller by the first power controller, such that the second power controller keeps the second light source in the on state within the predetermined time period.

In one embodiment, the control method further includes the following steps: adjusting the alternate mode to turn off the first light source by the first power controller when the first temperature detection module detects that the change rate of the operating temperature of the first light source or the first power controller exceeds a change rate threshold within the predetermined time period; and transmitting the control signal to the second power controller by the first power controller, such that the second power controller keeps the second light source in the on state within the predetermined time period.

In one embodiment, the control method further includes the following steps: reducing the brightness of the first light source by the first power controller when a first light intensity detection module detects that the ambient light intensity is within a first light intensity range; and increasing the brightness of the first light source by the first power controller when the first light intensity detection module detects that the ambient light intensity is within a second light intensity range.

In one embodiment, the control method further includes the following steps: executing the alternate mode by the first power controller when a first light intensity detection module detects that the ambient light intensity is within the first light intensity range; performing a master control mode by the first power controller when the first light intensity detection module detects that the ambient light intensity is within the second light intensity range; and keeping, in the master control mode, the second light source in the on state within the predetermined time period and simultaneously transmits the control signal to the second power controller by the first power controller, such that the second power controller keeps the second light source in the on state within the predetermined time period.

To sum up, the always-on lighting device having multiple power controllers and the method thereof according to the embodiments of the present invention may have the following advantages:

(1) In one embodiment of the present invention, the always-on lighting device has a plurality of power controllers and light sources. In addition, the always-on lighting device can perform an alternate mode to turn on these light sources by turns, so the always-on lighting device can effectively extend the service lives of these light sources.

(2) In one embodiment of the present invention, the always-on lighting device has a plurality of power controllers and light sources. Besides, the lighting device can execute the alternate mode and properly adjust the alternate mode according to the changes of the environmental factors. Thus, the light sources do not tend to be damaged due to the environmental factors, so the lighting device can be in always-on state for a long period of time in order to satisfy the requirements of various buildings.

(3) In one embodiment of the present invention, the always-on lighting device has a plurality of power controllers and light sources. Besides, the lighting device can appropriately be switched between the master control mode and the alternate mode, or dynamically adjust the brightness of the light sources. Therefore, the lighting device can not only save more energy, but also can meet actual requirements better.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
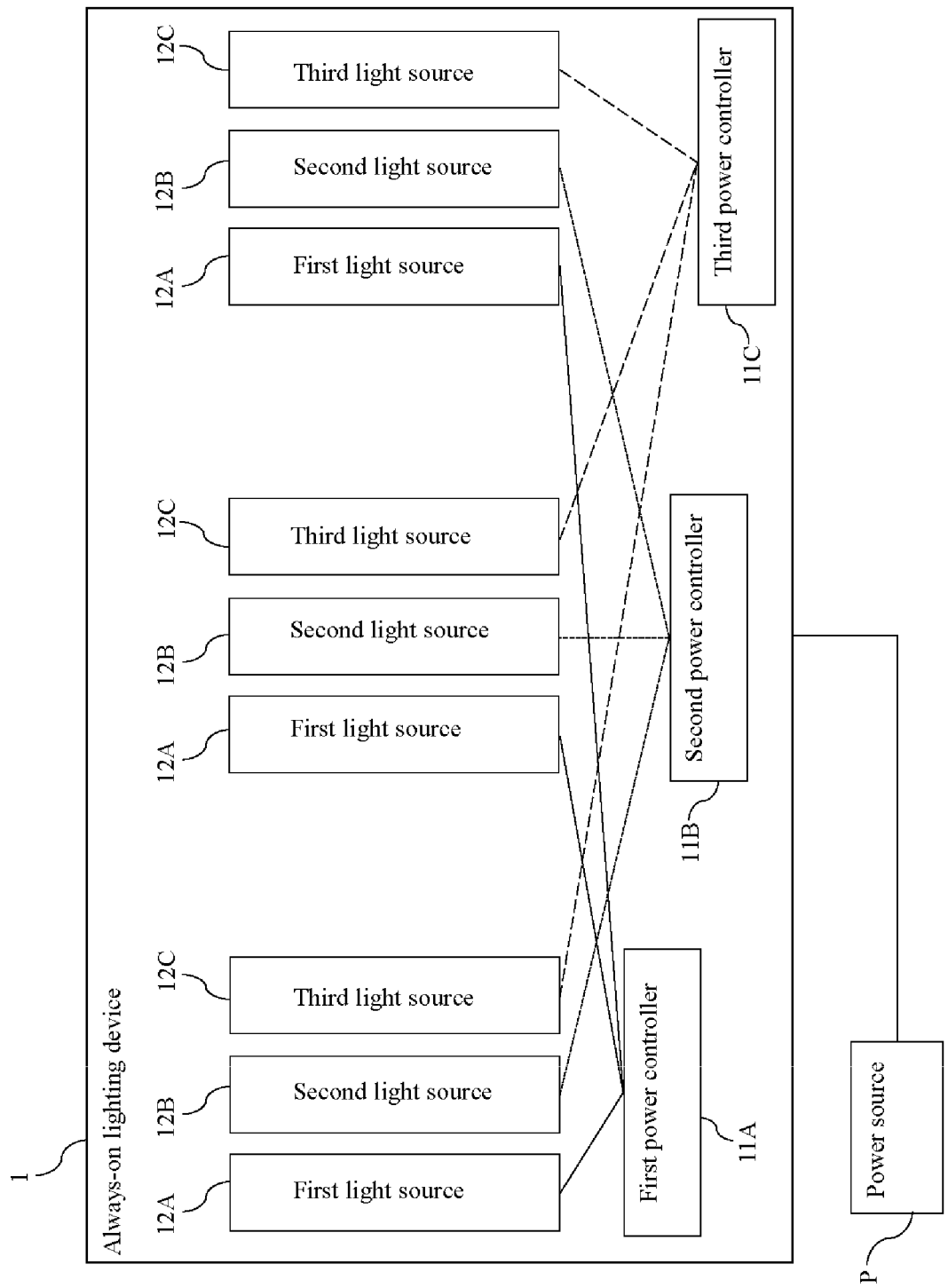
FIG. 1 is a block diagram of an always-on lighting device in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
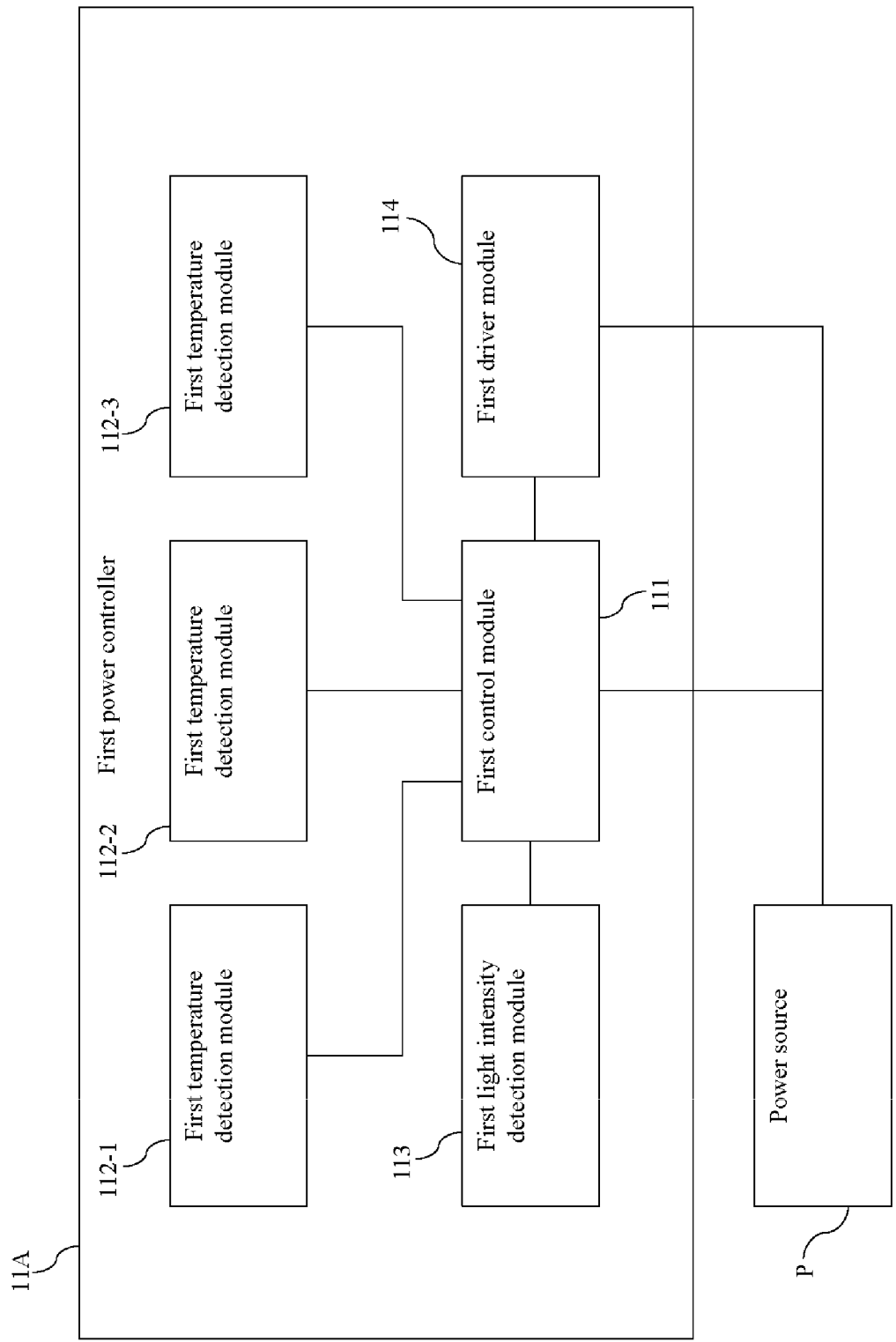
FIG. 2 is a block diagram of a first power controller of the always-on lighting device in accordance with one embodiment of the present invention.

Please refer to FIG. 1 and FIG. 2. FIG. 1 is a block diagram of an always-on lighting device in accordance with one embodiment of the present invention. FIG. 2 is a block diagram of a first power controller of the always-on lighting device in accordance with one embodiment of the present invention. As shown in FIG. 1, the always-on lighting device 1 is connected to a power source P (e.g., power grid). The always-on lighting device 1 includes a first power controller 11A, a second power controller 11B, a third power controller 11C, a plurality of first light sources 12A, a plurality of second light sources 12B and a plurality of third light sources 12C. The first power controller 11A is connected to the first light sources 12A. The second power controller 11B is connected to the second light sources 12B. The third power controller 11C is connected to the third light sources 12C. In this embodiment, the first light sources 12A, the second light sources 12B and the third light sources 12C may be, but not limited to, light-emitting diode (LED) lamp tubes; in another embodiment, the first light sources 12A, the second light sources 12B and the third light sources 12C may be fluorescent lamp tubes, bulbs or other currently available light sources.

As shown in FIG. 2, the first power controller 11A includes a first control module 111, a plurality of first temperature detection modules 112-1, 112-2, 112-3, a first light intensity detection module 113 and a first driver module 114.

The first control module 111 is connected to the power source P and powered by the power source P. Besides, the first control module 111 is further connected to the first temperature detection modules 112-1, 112-2, 112-3, the first light intensity detection module 113 and the first driver module 114 in order to control these modules. In one embodiment, the first control module 111 may be a microcontroller (MCU), a central processing unit (CPU) or other similar components.

The first temperature detection modules 112-1, 112-2, 112-3 detect the operating temperatures of the first light sources 12A and/or the first power controller 11A (or any one of the components thereof) respectively. In one embodiment, the first temperature detection modules 112-1, 112-2, 112-3 may be temperature sensors, chips having temperature detection function or other similar components.

The first light intensity detection module 113 detects the ambient light intensity. In one embodiment, the first light intensity detection module 113 may be a luminance transducer, an ambient light sensor or other similar components.

The first driver module 114 is connected to the power source P and powered by the power source P. The first driver module 114 is further connected to the first light sources 12A. The first driver module 114 is a driver corresponding to the first light sources 12A in order to driver the first light sources 12A.

The first power controller 11A can further include a first wireless communication module (not shown in the drawings). The first power controller 11A can communicate with the second power controller 11B and the third power controller 11C via the first wireless communication module. In one embodiment, the first wireless communication module may be a Bluetooth communication module, a ZigBee communication module or other similar components. The circuit structures of the second power source 11B and the third power controller 11C are the same with that of the first power controller 11A, so will not be described therein.

As shown in FIG. 1, the first power controller 11A, the second power controller 11B and the third power controller 11C execute an alternate mode. In the alternate mode, the first power controller 11A keeps the first light sources 12A within a predetermined time period. After the predetermined time period passes, the first power controller 11A turns off the first light sources 12A and transmits a control signal to the second power controller 11B. The predetermined time period can be adjusted according to actual requirements (for example, the predetermined time period may be, but not limited to, 4 hours, 6 hours, 8 hours, etc.) with a view to increase the service lives of the first power controller 11A and the first light sources 12A.

After the second power controller 11B receives the control signal transmitted by the first power controller 11A, the second power controller 11B keeps the second light sources 12B in on state within the predetermined time period. After the predetermined time period passes, the second power controller 11B turns off the second light sources 12B and transmits the control signal to the third power controller 11C.

Similarly, after the third power controller 11C receives the control signal transmitted by the second power controller 11B, the third power controller 11C keeps the third light sources 12C in on state within the predetermined time period. After the predetermined time period passes, the third power controller 11C turns off the third light sources 12C and transmits the control signal to the first power controller 11A. Via the above mechanism, the first power controller 11A, the second power controller 11B and the third power controller 11C can turn on the first light sources 12A, the second light sources 12B and the third light sources 12C by turns, such that the lighting device 1 can be always in on state.

When the first light sources 12A is in on state and any one of the first temperature detection modules 112-1, 112-2, 112-3 of the first power controller 11A detects the operating temperature of any one of the first light sources 12A and/or the first power controller 11A (or any one of the components thereof) exceeds a temperature threshold, the first power controller 11A adjusts the alternate mode. In this case, the first power controller 11A can turn off the first light sources 12A in order to prematurely turn off the first light sources 12A and transmit the control signal to the second power controller 11B. Meanwhile, the second power controller 11B keeps the second light sources 12B in on state within the predetermined timer period. Similarly, the second power controller 11B and the third power controller 11C can also perform the above mechanism. The above temperature threshold can be adjusted according to actual requirements so as to increase the service lives of the first power controller 11A and the first light sources 12A. The operating temperatures of the first light sources 12A and the first power controller 11A (or the components thereof) may be influenced by the environmental factors (e.g., weather, sunlight, etc.). This mechanism can effectively reduce the influences due to the environmental factors in order to prevent the first light sources 12A and the first power controller 11A from be damaged due to overheating.

When the first light sources 12A are in on state and any one of the first temperature detection modules 112-1, 112-2, 112-3 detects the change rate of the operating temperature of any one of the first light sources 12A and/or the first power controller 11A (or the components thereof) exceeds a change rate threshold, the first power controller 11A adjusts the alternate mode. The above change rate can be expressed by Equation (1) given below:

$$\Delta T/\Delta t \qquad (1)$$

In Equation (1), $\Delta T$ stands for the operating temperature; $\Delta t$ stands for a time period. In one embodiment, $\Delta t$ may be, but not limited to, the time interval between the operating temperature exceeding a predetermined safety temperature and the operating temperature exceeding a temperature threshold with a view to more precisely determine the occurrence of a fault condition (the predetermined safety temperature and the temperature threshold can be set according to actual requirements).

Alternatively, the first power controller 11A can adjust the alternate mode (prematurely turn off the first light sources 12A) when detecting that the operating temperature exceeds a predetermined upper temperature limit. The predetermined upper temperature limit can also be set and adjusted according to actual requirements.

In this case, the first power controller 11A determines that a fault condition occurs. At this moment, the first power controller 11A turns off the first light sources 12A to prematurely terminate the on state of the first light sources 12A. Meanwhile, the first power controller 11A transmits the control signal to the second power controller 11B, such that the second power controller 11B keeps the second light sources 12B in on state within the predetermined time period. Similarly, when the second light sources 12B and the third light sources 12C are in on state, the second power controller 11B and the third power controller 11C can also execute the above-mentioned mechanism. The change rate threshold can be set and adjusted according to actual requirements with a view to extend the service lives of the second power controller 11B, the third power controller 11C, the second light sources 12B and the third light sources 12C.

When the first light intensity detection module 113 of the first power controller 11A detects that the ambient light intensity is within a first light intensity range, the first power controller 11A reduces the brightness of the first light sources 12A. on the contrary, when the first light intensity detection module 113 of the first power controller 11A detects that the ambient light intensity is within a second light intensity range (the light intensity of the first light intensity range is greater than that of the second light intensity range), the first power controller 11A increases the brightness of the first light sources 12A. Similarly, when the second light sources 12B and the third light sources 12C are in on state, the second power controller 11B and the third power controller 11C can also perform the above-mentioned mechanism. For instance, the ambient light intensity may be greater in day, but significantly decrease in night, so the above mechanism can make sure that the always-on lighting device 1 can provide appropriate brightness in night.

Moreover, when the first light sources 12A are in on state and the first light intensity detection module 113 detects that the ambient light intensity is within the first light intensity range, the first power controller 11A executes the alternate mode. When the first light intensity detection module 113 detects that the ambient light intensity is within the second light intensity range (the light intensity of the first light intensity range is greater than that of the second light intensity range), the first power controller 11A executes a master control mode. In the master control mode, the first power controller 11A keeps the first light sources 11A in on state within the predetermined time period and simultaneously transmits the control signal to the second power controller 11B in order to make the second power controller 11B keep the second light sources 12B in on state within the predetermined time period. In this case, the first light sources 11A and the second light sources 12B are simultaneously in on state within the predetermined time period.

After the predetermined time period passes, the first power controller 11A turns off the first light sources 11A, and simultaneously transmits the control signal to the second power controller 11B and the third power controller 11C, such that the second power controller 11B and the third power controller 11C keep the second light sources 12B and the third light sources 12C in on state within the predetermined time period. After the predetermined time period passes again, the first power controller 11A turns on the first light sources 11A and keeps the first light sources 11A in on state within the predetermined time period. In the meanwhile, the first power controller 11A transmits the control signal to the second power controller 11B and the third power controller 11C, such that the second power controller 11B turns off the second light sources 12B and the third power controller 11C still keeps the third light sources 12C in on state within the predetermined timer period.

After the predetermined time period passes again, the first power controller 11A keeps the first light sources 12A in on state within the predetermined time period, and simultaneously transmits the control signal to the second power controller 11B and the third power controller 11C, such that the second power controller 11B turns on the second light sources 12B and keeps the second light sources 12B in on state within the predetermined timer period, and the third power controller 11C turns off the third light sources 12C. As set forth above, the first power controller 11A serves as the master controller in the master control mode and keeps repeating the above steps, such that the always-on lighting device 1 can turn on more light sources when the ambient light intensity is within the second light intensity range (e.g., in night).

The embodiment just exemplifies the present invention and is not intended to limit the scope of the present invention; any equivalent modification and variation according to the spirit of the present invention is to be also included within the scope of the following claims and their equivalents.

Figure 3:
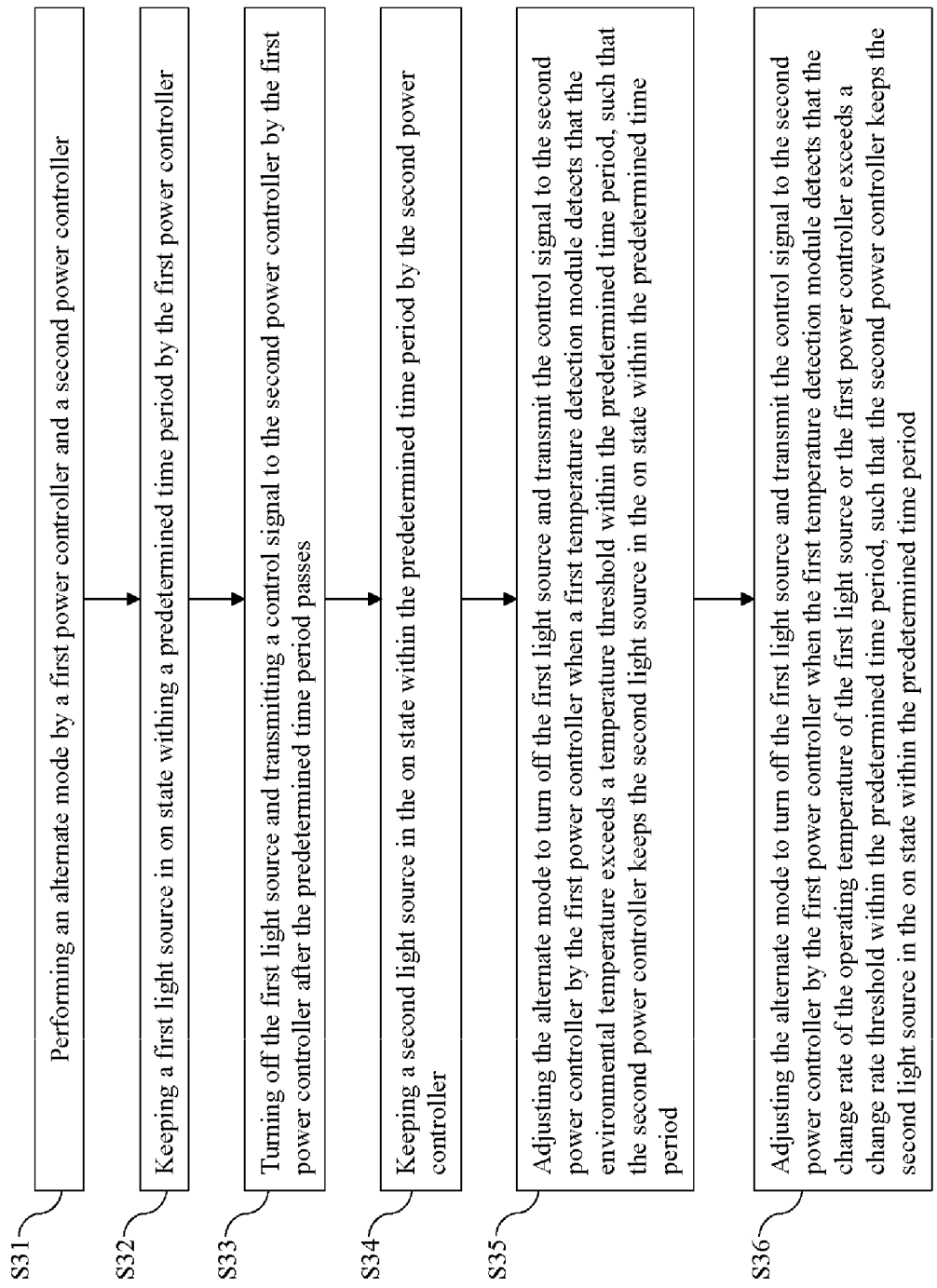
FIG. 3 is a flow chart of a control method for the always-on lighting device in accordance with one embodiment of the present invention.

Please refer to FIG. 3, which is a flow chart of a control method for the always-on lighting device in accordance with one embodiment of the present invention. As shown in FIG. 3, the control method for the always-on lighting device in accordance with the embodiment includes the following steps:

S31: performing an alternate mode by a first power controller and a second power controller.

S32: keeping a first light source in on state within a predetermined time period by the first power controller.

S33: turning off the first light source and transmitting a control signal to the second power controller by the first power controller after the predetermined time period passes.

S34: keeping a second light source in the on state within the predetermined time period by the second power controller.

S35: adjusting the alternate mode to turn off the first light source and transmit the control signal to the second power controller by the first power controller when a first temperature detection module detects that the environmental temperature exceeds a temperature threshold within the predetermined time period, such that the second power controller keeps the second light source in the on state within the predetermined time period.

S36: adjusting the alternate mode to turn off the first light source and transmit the control signal to the second power controller by the first power controller when the first temperature detection module detects that the change rate of the operating temperature of the first light source or the first power controller exceeds a change rate threshold within the predetermined time period, such that the second power controller keeps the second light source in the on state within the predetermined time period.

To sum up, according to one embodiment of the present invention, the always-on lighting device has a plurality of power controllers and light sources. In addition, the always-on lighting device can perform an alternate mode to turn on these light sources by turns, so the always-on lighting device can effectively extend the service lives of these light sources.

Further, according to one embodiment of the present invention, the always-on lighting device has a plurality of power controllers and light sources. Besides, the lighting device can execute the alternate mode and properly adjust the alternate mode according to the changes of the environmental factors. Thus, the light sources do not tend to be damaged due to the environmental factors, so the lighting device can be in always-on state for a long period of time in order to satisfy the requirements of various buildings.

Moreover, according to one embodiment of the present invention, the always-on lighting device has a plurality of power controllers and light sources. Besides, the lighting device can appropriately be switched between the master control mode and the alternate mode, or dynamically adjust the brightness of the light sources. Therefore, the lighting device can not only save more energy, but also can meet actual requirements better.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An always-on lighting device having multiple power controllers, comprising:
   a first power controller;
   a first light source, connected to the first power controller;
   a second power controller; and
   a second light source, connected to the second power controller;
   wherein the first power controller and the second power controller execute an alternate mode, wherein the first power controller keeps the first light source in an on state within a predetermined time period, and turns off the first light source after the predetermined time period passes and simultaneously transmits a control signal to the second power source, whereby the second power controller keeps the second light source in the on state within the predetermined time period.

2. The always-on lighting device having multiple power controllers as claimed in claim 1, wherein the first power controller further comprises a first temperature detection module, wherein when the first temperature detection module detects that an environmental temperature exceeds a temperature threshold within the predetermined time period, the first power controller adjusts the alternate mode so as to turn off the first light source and transmit the control signal to the second power controller, whereby the second power controller keeps the second light source in the on state within the predetermined time period.

3. The always-on lighting device having multiple power controllers as claimed in claim 1, wherein the first power controller further comprises a first temperature detection module, wherein when the first temperature detection module detects that a change rate of an operating temperature of the first light source or the first power controller exceeds a change rate threshold within the predetermined time period, the first power controller adjusts the alternate mode so as to turn off the first light source and transmit the control signal to the second power controller, whereby the second power controller keeps the second light source in the on state within the predetermined time period.

4. The always-on lighting device having multiple power controllers as claimed in claim 1, wherein the first power controller further comprises a first light intensity detection module, wherein when the first light intensity detection module detects that an ambient light intensity is within a first light intensity range, the first power controller reduces a brightness of the first light source, wherein when the first light intensity detection module detects that the ambient light intensity is within a second light intensity range, the first power controller increases the brightness of the first light source.

5. The always-on lighting device having multiple power controllers as claimed in claim 1, wherein the first power controller further comprises a first light intensity detection module, wherein when the first light intensity detection module detects that an ambient light intensity is within a first light intensity range, the first power controller executes the alternate mode, wherein when the first light intensity detection module detects that the ambient light intensity is within a second light intensity range, the first power controller performs a master control mode in order to keeps the first light source in the on state within the predetermined time period and simultaneously transmits the control signal to the second power controller for the second power controller to keep the second light source in the on state within the predetermined time period.

6. A control method for an always-on lighting device having multiple power controllers, comprising:
    performing an alternate mode by a first power controller and a second power controller;
    keeping a first light source in an on state within a predetermined time period by the first power controller;
    turning off the first light source and transmitting a control signal to the second power controller by the first power controller after the predetermined time period passes; and
    keeping a second light source in the on state within the predetermined time period by the second power controller.

7. The control method for the always-on lighting device having multiple power controllers as claimed in claim 6, further comprising:
    adjusting the alternate mode to turn off the first light source by the first power controller when a first temperature detection module detects that an environmental temperature exceeds a temperature threshold within the predetermined time period; and
    transmitting the control signal to the second power controller by the first power controller, whereby the second power controller keeps the second light source in the on state within the predetermined time period.

8. The control method for the always-on lighting device having multiple power controllers as claimed in claim 6, further comprising:
    adjusting the alternate mode to turn off the first light source by the first power controller when the first temperature detection module detects that a change rate of an operating temperature of the first light source or the first power controller exceeds a change rate threshold within the predetermined time period; and
    transmitting the control signal to the second power controller by the first power controller, whereby the second power controller keeps the second light source in the on state within the predetermined time period.

9. The control method for the always-on lighting device having multiple power controllers as claimed in claim 6, further comprising:
    reducing a brightness of the first light source by the first power controller when a first light intensity detection module detects that an ambient light intensity is within a first light intensity range; and
    increasing the brightness of the first light source by the first power controller when the first light intensity detection module detects that the ambient light intensity is within a second light intensity range.

10. The control method for the always-on lighting device having multiple power controllers as claimed in claim 6, further comprising:
    executing the alternate mode by the first power controller when a first light intensity detection module detects that an ambient light intensity is within a first light intensity range;
    performing a master control mode by the first power controller when the first light intensity detection module detects that the ambient light intensity is within a second light intensity range; and
    keeping, in the master control mode, the second light source in the on state within the predetermined time period and simultaneously transmits the control signal to the second power controller by the first power controller, whereby the second power controller keeps the second light source in the on state within the predetermined time period.

\* \* \* \* \*